Feb. 7, 1950      J. M. LAFFERTY      2,496,879
HIGH-FREQUENCY DETECTION AND MEASUREMENT DEVICE
Filed Oct. 24, 1947
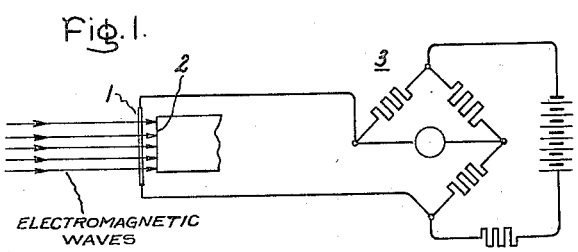
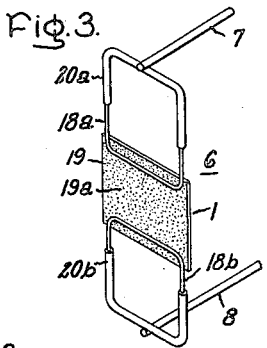
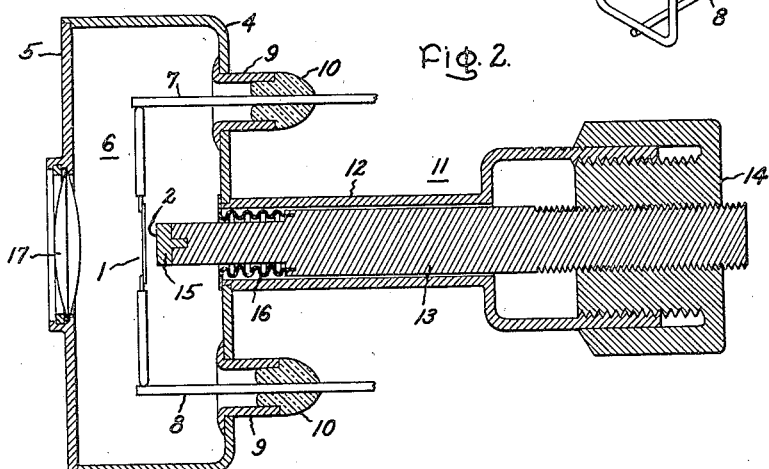
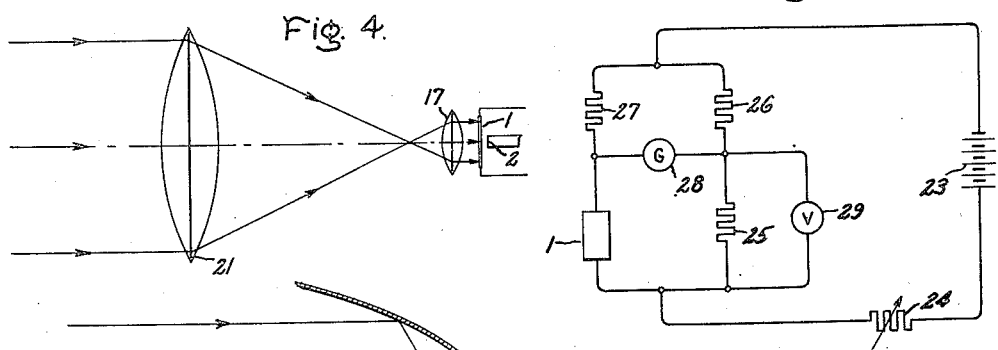
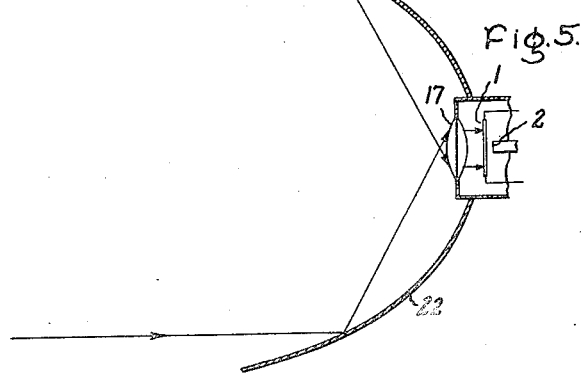
Inventor:
James M. Lafferty.
by Harry R. Mayers
His Attorney.

Patented Feb. 7, 1950

2,496,879

UNITED STATES PATENT OFFICE 2,496,879

HIGH-FREQUENCY DETECTION AND MEASUREMENT DEVICE

James M. Lafferty, Schenectady, N. Y., assignor to General Electric Company, a corporation of New York Application October 24, 1947, Serial No. 781,885

12 Claims. (Cl. 250—39)

The present invention relates to improvements in devices for the detection and power or wavelength measurement of electromagnetic waves of ultra short wavelengths (e. g., wavelengths of the order of millimeters).

The detection and power or wavelength measurement of ultra short wavelengths is conventionally accomplished by means of a bolometer element in conjunction with an impedance measuring circuit. A common form of the bolometer element is a resistive bead supported by two fine wires. Since the impedance of the bolometer element changes with its temperature, and its temperature changes with the amount of energy absorbed by the element, the change in impedance of the bolometer element is a function of the energy absorbed by the bolometer element. When the bolometer element is properly matched to a wave guide, the change in impedance of the bolometer element is a measure of the change in power flow down the wave guide.

Because of the very small physical distances involved, wavelength measurement in the ultra-short wavelength region becomes difficult with conventional bolometers. Moreover, in cases where the conventional bolomter element can be placed in a wave guide it introduces discontinuities which are hard to completely tune out. Further, the conventional bolometer element would be quite an inefficient absorber of electromagnetic waves traveling in space since it represents a discontinuity in the impedance of the medium through which the wave is traveling and acts like a lumped element as distinguished from a distributed element.

The conventional devices used in the optical wavelength region employ a different kind of bolometer element for detection and measurement of radiation. This bolometer element comprises a metallic surface which has been covered with carbon black so as to make it a very efficient absorber of optical wavelengths. By measurement of the change in temperature of this bolometer element by some suitable means, such as thermocouples, a change in the power absorption of the bolometer element can be readily measured. Bolometer elements of this kind cannot be used for the absorption of power in the ultra high frequency range since they would reflect a great portion of the incident energy. It is thus seen that a new bolometer technique is necessary for the detection and power or wavelength measurement of ultra high frequency electromagnetic waves in the transitional region indicated in the foregoing paragraphs.

The present invention provides such a technique and, as one embodiment, may comprise a bolometer element in the form of a thin resistive sheet whose impedance per square is made substantially equal to the wave impedance of the medium in which the measurement is being conducted. By placing a reflector one quarter of a wavelength behind the bolometer element or at any odd multiple of quarter wavelength intervals, all the power incident upon the bolometer element is absorbed by it. This type of element can be readily used to detect and to measure the characteristics of electromagnetic energy traveling in space.

It is an object of this invention to provide an improved means for the detection of and measurement of either power or wavelength of ultra high frequency electromagnetic energy of ultra short wavelengths.

It is a further object of this invention to provide an improved means for the detection of and measurement of either power or wavelength of ultra high frequency electromagnetic energy of ultra short wavelengths with maximum efficiency by using a bolometer element in which the wave impedance per square is equal to the wave impedance of air or of the medium in which the measurement is being conducted.

The features of the invention which I consider novel are pointed out with particularity in the appended claims. The invention itself together with its further objects and advantages may best be understood by reference to the following description when taken in connection with the accompanying drawings in which Fig. 1 is a diagrammatic representation of a system helpful in explaining the principles and the utility of the invention; Fig. 2 is a cross-sectional view of a practical device embodying the invention; Fig. 3 is a perspective view of the bolometer element used in the device; Fig. 4 is a diagrammatic view of the device used with a lens for concentrating the electromagnetic waves; Fig. 5 shows the device used in connection with a parabolic reflector for concentrating the electromagnetic waves into the device; Fig. 6 shows a circuit for the purpose of measuring large amounts of electromagnetic energy.

The electromagnetic wave phenomena upon which the operation of the invention depends are well known in the art, and can be simply explained by referring to a transmission line analogy. The impedance of a transmission line as viewed from a point one quarter of a wavelength (or odd multiple thereof) from a short circuit on the transmission line and looking toward the short is infinite; however, if a load impedance equal to the characteristic impedance of the transmission line is connected at this point one quarter of a wavelength from the short, the impedance at any point on the transmission line beyond the load impedance looking toward the load impedance is equal to the characteristic impedance of the transmission line; and hence all reflections originally introduced by the short circuit on the transmission line are completely cancelled and all of the energy travelling down the line is absorbed by the load impedance. The laws governing the behavior of electromagnetic waves in free space are in many respects similar to the laws governing transmission of electromagnetic waves by means of guides or transmission lines. With one embodiment of the present invention, a metallic reflector takes the place of a short circuit and a thin resistive sheet of material, whose impedance per square is equal to the wave impedance of air, takes the place of the power absorbing impedance of the transmission line analogy. It is readily seen by reference to the transmission line analogy that when the resistive sheet is one quarter of a wavelength from the metallic reflector all of the electromagnetic energy incident upon the resistive sheet is absorbed by it. It is further to be observed that if the load impedance in either the transmission line case or the free space case differs from the characteristic impedance of the transmission line or free space, reflections will be introduced. Reflections are minimized in this case when the short circuit or the reflector is other than one quarter of a wavelength from the load impedance; however, the distance between successive positions of the reflector where reflections from the bolometer element are a minimum is one-half of a wavelength.

One illustrative use of this basic principle to accomplish the useful result set forth in the objects of the invention is best understood by referring to Fig. 1. This figure shows a bolometer element 1 and a reflector surface 2 which is movable with respect to the bolometer element 1. The bolometer element 1 is in the form of a thin resistive sheet having a thickness negligible relative to the wavelengths measured and has impedance per square comparable or equal to the wave impedance of air. A pair of conductors connect the bolometer element 1 with a bridge circuit 3. When the reflector surface 2 is located at an odd number of quarter wavelengths from the bolometer element, all of the incident energy is absorbed by the bolometer element 1. Similarly when reflector surface 2 is located at an even number of quarter wavelengths from the bolometer element 1 no energy is absorbed by it. The resistance of the bolometer element 1 changes with the amount of power absorbed by it. Assuming that a bolometer element 1 with a negative temperature coefficient of resistance is being used, the minimum value of resistance reached by the bolometer element 1 can be readily determined by the bridge circuit 3. This minimum value will indicate the condition when the reflector surface 2 is an odd number of quarter wavelengths behind the bolometer element 1. Similarly a maximum value will indicate the condition when the reflector surface 2 is an even number of quarter wavelengths behind the bolometer element 1. It is readily appreciated by those skilled in the art that bolometer elements of positive coefficients of resistance could be used as well in which case the conditions of maximum and minimum resistance are reversed. By measurement of the distance between different reflector positions at which either maximum or minimum resistance values are indicated, the wavelength of the electromagnetic energy may be determined.

In Fig. 2 is shown a preferred embodiment of the invention. The housing 4 comprises an annular plate construction of metal. A front plate 5, containing an opening in which a collimating lens or window 17 is hermetically sealed, may be suitably affixed as by brazing to the housing 4. The bolometer assembly 6 is suitably supported and connected to conductors 7 and 8 which comprise the means for external electrical connection of the bolometer element 1. The wire supports 7 and 8 are suitably attached and insulated from the housing 4 by means of the eyelets 9 and the glass beads 10. The eyelets are suitably brazed to the housing 4. The micrometer assembly 11 comprises a shank member 12, a reflector support member 13 and a knob member 14 adapted to move reflector support member 13 with respect to shank member 12. One end of shank member 12 is suitably brazed to the housing 4, the other end of the shank member 12 is suitably calibrated. The reflector support member 13 slidably fits in a bore through the shank member 12. To the one end of reflector support member 13 is soldered a reflector tip 15, preferably of silver and having a flat reflecting surface facing assembly 6. The reflector support member 13 is preferably made long in order to keep the reflector tip 15 accurately aligned with the bolometer element 1. The other end of reflector support member 13 is finely threaded so as to suitably engage with knob member 14. The knob member 14 also engages with the mover surface of shank member 12 by means of coarse threads as shown. By turning knob member 14 the reflector tip 15 can be moved with respect to bolometer assembly 6. Since it is desirable to have the interior of the device evacuated in order to increase its sensitivity a bellows member 16 is suitably connected between housing 4 and reflector support member 13. By connecting the leads 7 and 8 to a suitable impedance measuring circuit the device is ready for operation.

In Fig. 3 is shown a detailed construction of the bolometer assembly 6. The bolometer element 1 comprises a supporting structure 19 coated with the bolometer material 19a so that its resistance per square is equal to the wave impedance of air or vacuum. Wire members 18a and 18b are in conductive contact with the bolometer material 19a on opposite edges of the bolometer element 1. The wire members 18 and 18b may be cemented to the supporting structure 19 or they may take the form of strips of suitable material such as silver, platinum or gold painted on the member 19 by techniques well known in the art. Wire members 18a and 18b which support the bolometer element are in turn supported by the wire members 20a and 20b through which electrical contact to the external circuit may be made. The supporting structure 19 can be made of any suitable thin material such as mica or glass. The bolometer element material 19a could be tin oxide, nickel oxide, cobalt oxide, uranium oxide, tin chloride or any other such suitable material. Materials with positive temperature coefficients of resistance such as cobalt, iron and nickel could as well be used. Among the characteristics desirable in the bolometer element are low specific heat, small mass and large temperature coefficient of resistance.

One way to obtain the above discussed bolometer element construction would be to rigidly fasten on opposite edges of a thin square of mica the wire members 18a and 18b. The electrodes of a resistance measuring circuit are placed in contact with the wire members 18a and 18b so that an accurate reading of the resistance between the two sides can be obtained. The mica is now coated with tin or other suitable material by such processes as evaporation or sputtering which are well known in the art. The tin is next oxidized in a furnace or by other suitable means until the resistance reading between the wire members 18a and 18b is equal to the desired impedance which in accordance with the invention such that the impedance per square is equal to the wave impedance of free space or air (377 ohms). By impedance per square is meant the ohmic impedance or resistance from edge to opposite edge of any square shaped section in the plane of elements 18a and 18b. It will be understood that for a homogenous material that the resistance value would be the same regardless of the size of the square. It is readily apparent to one skilled in the art that the sheet made in this way presents an impedance to electromagnetic waves traveling in space in a direction perpendicular to the square, which is the same as the impedance measured by the means described above i. e., ohmic impedance. When it is desirable to use a bolometer material which has a positive coefficient of resistance such as with the metals mentioned above, the process is quite similar except for the oxidation of the metal. To coat the mica with tin chloride it is desirable to heat the mica and then spray an alcoholic solution of tin chloride on it until the desired resistance is obtained.

In order to minimize heat loss by conduction from the bolometer element 1, it is desirable to make the wires 18a and 18b small. To minimize heat loss from the bolometer element by convection it is desirable to enclose the bolometer element in a vacuum. In order to minimize the heat loss from the bolometer element by radiation it is desirable to make the element no larger than the area actually irradiated by radiant energy. By minimizing heat loss from the bolometer element the sensitivity of the device is increased. An alternative means of measuring the temperature change of the bolometer element 1 would be by incorporating a thermocouple in the bolometer material 19a. The thermocouple, with the appropriate circuit means well known in the art, could thus be used to measure the amount of power being absorbed by the bolometer element.

In the present invention, the bolometer element 1 can always be very closely matched to a wave guide in which it might be used or to the space impedance so that accurate power measurements can be obtained. By closely matching the impedance of the bolometer element to the guide or to space its sensitivity is increased. The sensitivity of the device is also increased by using a concentrating means such as a lens 21 in Fig. 4 or a parabolic mirror 22 as in Fig. 5. The invention can be used to measure large as well as small amounts of power. However, when large amounts of power are being measured it would be desirable to revise the measurement technique since the wave impedance of the bolometer element will change appreciably with the amount of power absorbed, hence, the accuracy of the device as a power measuring means would suffer. One way in which this problem can be met is by using a bolometer element with a negative coefficient of resistance with an impedance per square greater than the wave impedance of air of vacuum. By passing a steady direct current through the bolometer element 1, the bolometer element 1 can be heated sufficiently so that its wave impedance is now equal to the wave impedance of the air or vacuum. As ultra high frequency power is absorbed by the bolometer element the direct current passed through the bolometer element can be decreased in order to keep the bolometer element matched to the air or vacuum. The decrease in the amount of power supplied through the direct current source to the bolometer is equal to the power absorbed by the bolometer element from the high frequency source. The modifications in this technique when a bolometer element with a positive temperature coefficient of resistance is used is readily apparent to one skilled in the art.

From the foregoing explanation it is readily apparent to one skilled in the art how the circuit of Fig. 6 can be used to measure large amounts of power. Element 23 represents a direct current power source. Element 24 represents variable impedance means for controlling the amount of power fed into the bolometer element 1 to vary its impedance. Elements 25, 26 and 27 represent parts of a bridge network of which bolometer element 1 is the fourth leg. Element 28 represents a suitable indicator such as a galvanometer. Element 29 represents a voltage measuring means which is used to measure the change in power absorption of bolometer element 1 from the direct current power source 23 with changes in the variable impedance means 24. The impedance of element 25 is made equal to the wave impedance of the medium in which the measurement is being conducted. When the bridge is balanced the impedance of bolometer element 1 is equal to the impedance of element 25. Under this condition the change in power absorbed by element 1 from the direct current power source 23 is readily determined from the relationship:

$$P = \frac{V_1^2 - V_2^2}{R}$$

where
$P$ = electromagnetic wave energy absorbed by the bolometer element.
$V_1$ = voltage across element 1 when the bridge is balanced and no electromagnetic wave energy is being absorbed by the bolometer element.
$V_2$ = voltage across the element 1 when the bridge is balanced and electromagnetic energy is absorbed by element 1.
$R$ = resistance of element 25 which is equal to the magnitude of wave impedance of the medium in which the measurement is being conducted.

The advantages obtained in using the present invention for wavelength measurement are the same as those advantages of the device as power measurement means. Wavelength can be measured by maximizing or minimizing power absorption by means of the knob member 14 which is connected to the reflector tip 15, for two succesive positions. The distance between these successive positions would be one-half of the wavelength being measured. By maximizing is meant adjusting the position of the reflector tip 15 so that maximum or minimum power is absorbed by the bolometer element 1.

While the invention has been described by reference to particular embodiments, it is obvious that further arrangements and applications will occur to those skilled in the art and I, therefore, aim in the appended claims to cover all such equivalent variations as come within the true spirit and scope of the invention.

What I claim as new and desire to secure by Letters Patent of the United States is:

1. In an ultra short wave measuring system for the measurement of electromagnetic energy in free space the combination which includes a member comprising a structure whose impedance characteristics vary with its absorption of electromagnetic wave power, said structure having a wave impedance comparable to the wave impedance of free space and means connecting with said structure for facilitating continuous measurement of its impedance characteristics, a wave reflecting element in proximity to said member and adjustably spaced with reference to it, whereby relative movement of said element and member may be utilized to maximize the power absorption of said structure for any wave length within the range of intended use of the system, and means to measure the spacing of said element and said member in order to provide an index of the received wave length when maximum power absorption has been attained.

2. The device of claim 1 in combination with a circuit for measuring the impedance characteristics of the bolometer structure.

3. The device of claim 1 in which a collimating lens is used to concentrate the electromagnetic waves onto the bolometer element.

4. The device of claim 1 in which the wave impedance of said bolometer element is equal to the wave impedance of air.

5. The device of claim 1 in which a focusing means is used to concentrate the electromagnetic waves onto the bolometer element.

6. In an ultra short wave measuring system for the measurement of electromagnetic energy in free space the combination which includes a member comprising a structure whose impedance characteristics vary with its absorption of electromagnetic wave power, said structure having an impedance per square comparable to the wave impedance of free space and conductors connecting with said structure for facilitating continuous measurement of its impedance characteristics, a wave reflecting element in proximity to said member and adjustably spaced with reference to it, whereby relative movement of said element and member may be utilized to maximize the power absorption of said element for any wavelength within the range of intended use of the system, and means to measure the distance between successive positions of said element to obtain maximum power absorption to provide an index of the received wavelength.

7. A device for wavelength measurement in a medium, comprising an hermetically sealed housing element with a window, a thin plane bolometer structure therewithin whose wave impedance characteristics vary with its absorption of electromagnetic wave power and whose impedance per square is substantially equal to the wave impedance of the medium in which the measurement is conducted, said structure being located adjacent said window and rigidly fixed to said housing element, conductors connecting with said structure for facilitating continuous measurement of its impedance characteristics, a wave reflecting element in proximity to said bolometer structure and adjustable spaced with reference to it whereby relative movement of said element with respect to said bolometer element may be utilized to maximize the power absorption of said element for any wave length within the range of intended use of the system, and means to measure the spacing of said element and said member in order to provide an index of the received wave lengths when maximum power absorption has been attained.

8. A device for measuring electromagnetic waves in a medium comprising a bolometer element having an impedance per square substantially equal to the wave impedance of the medium in which said waves are propagated, a wave reflecting member in proximity to said bolometer element and positioned to reflect said waves to said element, said member being spaced from said element by a distance substantially equal to an integral number of quarter wavelengths of said waves.

9. A device as in claim 8 including means for adjusting the spacing between said element and said member.

10. A device for measuring electromagnetic waves in a medium comprising a bolometer element including an extended conductive surface of thickness which is relatively negligible relative to the length of said waves, said surface having an impedance per square substantially equal to the wave impedance of the medium, a wave reflecting member having an extended reflecting surface positioned to reflect said waves to said element, said member being spaced from said element by a distance substantially equal to an integral number of quarter wavelengths of said waves.

11. A device as in claim 10 including means for adjusting the spacing between said element and said member.

12. A device for measuring electromagnetic waves comprising a bolometer element including an extended conductive surface of thickness which is relatively negligible with respect to the length of said waves, said surface having an impedance per square substantially equal to the wave impedance of air, a wave reflecting member having an extended reflecting surface positioned to reflect said waves to said element, said member being spaced from said element by a distance substantially equal to an integral number of quarter wavelengths of said waves, the surface of said bolometer element and said member being plane and mutually parallel, and means for adjusting the spacing between said element and said member.

JAMES M. LAFFERTY.

REFERENCES CITED

The following references are of record in the file of this patent:

UNITED STATES PATENTS

| Number | Name | Date |
| --- | --- | --- |
| 1,921,117 | Darbord | Aug. 8, 1933 |
| 1,929,878 | Clavier | Oct. 10, 1933 |
| 2,151,118 | King | Mar. 21, 1939 |
| 2,400,777 | Okress | May 21, 1946 |
| 2,402,663 | Ohl | June 25, 1946 |
| 2,414,499 | Webber | Jan. 21, 1947 |
| 2,419,613 | Webber | Apr. 29, 1947 |